Figure 1:
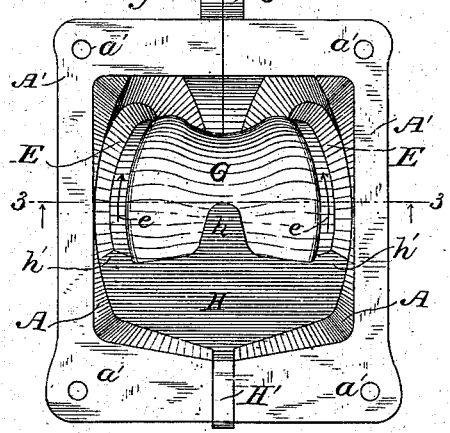

(Model.) 4 Sheets—Sheet 1.

A. J. MARTIN.
APPARATUS FOR DISTRIBUTING GRAIN AND FERTILIZERS.

No. 295,655. Patented Mar. 25, 1884.

WITNESSES
Wm A. Skinkle
H. W. Elmore

INVENTOR
Andrew J. Martin
By his Attorneys,
Baldwin, Hopkins & Peyton (Model.) 4 Sheets—Sheet 2.

A. J. MARTIN.
APPARATUS FOR DISTRIBUTING GRAIN AND FERTILIZERS.

No. 295,655. Patented Mar. 25, 1884.

WITNESSES
Wm A. Skinkle
H. W. Elmore.

INVENTOR
Andrew J. Martin.
By his Attorneys (Model.)

4 Sheets—Sheet 3.

A. J. MARTIN.
APPARATUS FOR DISTRIBUTING GRAIN AND FERTILIZERS.

No. 295,655.

Patented Mar. 25, 1884.

WITNESSES
Wm A. Skinkle
H. W. Elmore

INVENTOR
Andrew J. Martin
By his Attorneys, (Model.)

4 Sheets—Sheet 4.

A. J. MARTIN.
APPARATUS FOR DISTRIBUTING GRAIN AND FERTILIZERS.

No. 295,655.  Patented Mar. 25, 1884.

WITNESSES  
Wm A. Skinkle  
H. W. Elmore.

INVENTOR  
Andrew J. Martin.  
By his Attorneys

UNITED STATES PATENT OFFICE.

ANDREW J. MARTIN, OF MECHANICSBURG, OHIO, ASSIGNOR TO THE MECHANICSBURG MACHINE COMPANY, OF SAME PLACE.

APPARATUS FOR DISTRIBUTING GRAIN AND FERTILIZERS.

SPECIFICATION forming part of Letters Patent No. 295,655, dated March 25, 1884.

Application filed November 28, 1883. (Model.)

*To all whom it may concern:*

Be it known that I, ANDREW J. MARTIN, of Mechanicsburg, in the county of Champaign and State of Ohio, have invented certain new and useful Improvements in Apparatus for Distributing Grain and Fertilizers, of which the following is a specification.

My invention relates to improvements applicable to "force-feed" grain-distributers as well as to fertilizer-distributers.

In accordance with my invention—to be in detail described preparatory to designation by my claims of the subject-matter deemed novel— I provide rotating feed-wheels arranged in pairs in feed cups or cases, in which they have their bearings, and set obliquely to a driving-shaft, with which they are geared. The inclination of the feed-wheels of a pair is such that their faces approach each other closely below their shaft. The material being distributed first passes to the action of the pair of feed-wheels at top, where their faces are comparatively widely separated, and from whence they converge downwardly. The wheel inclosing-and-supporting cup or case is approximately of inverted-cone shape, and is made in sections; these sections (two parts for each cup) being arranged obliquely to the driving-shaft to correspond with the inclination of the feed-wheels. In this way there is provided a feed-passage in the cup between the feed-wheels, which is gradually contracted from top to bottom, and the material is forced by the feed-wheels downward and around to the point of discharge at the lower rear part of the cup or case. Each feed-wheel has a central opening of a diameter exceeding that of the driving-shaft, and is provided with gear-teeth constituting a bevel-gear around this opening. The driving-shaft passes through the central openings of the feed-wheels, and is provided with bevel-pinions to mesh with the bevel-gears of the feed-wheels, so that by the rotation of the driving-shaft the feed-wheels are revolved in the feed-cups. To provide for a double run, or distribution of grain in two streams, a third feed wheel or disk is employed in connection with each pair of the obliquely-arranged feed-wheels. This disk is vertical. It is interposed centrally between the inclined feed-wheels and secured to the driving-shaft. The material is discharged at both sides of the vertical central disk.

In the accompanying drawings leading features of my invention are shown as organized for operation both for "single-run" delivery, which is deemed preferable for distributing fertilizers, and for "double-run" delivery, best adapted for distributing grain.

The drawings do not show the hopper, nor the bearings or hangers for the driving-shaft, except those in the sides of the feed-cups; neither do they show a series of distributers, such illustration being unnecessary in describing my improvements, which are to be applied to use in connection with all needed features of any suitable old machine.

Figure 4:
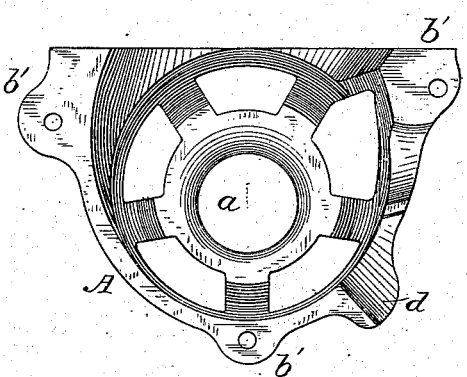
Figure 2:
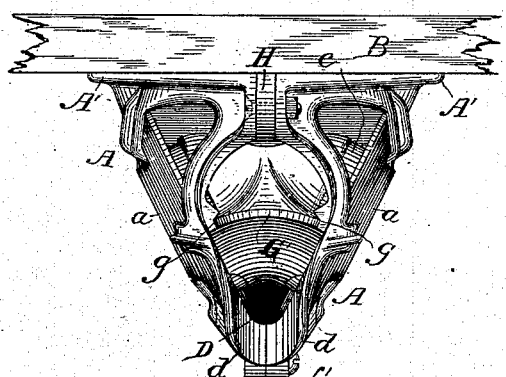
Figure 5:
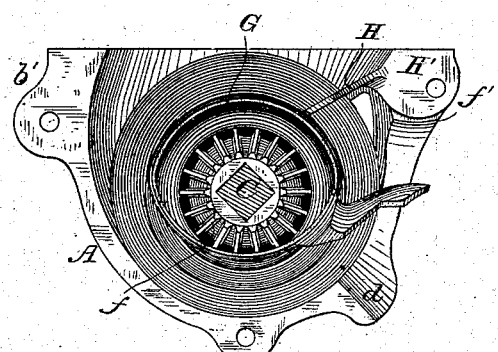
Figure 3:
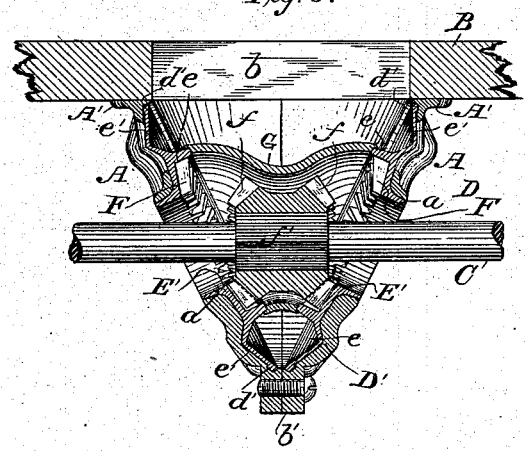
Figure 6:
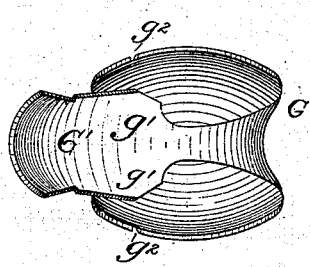
Figure 7:
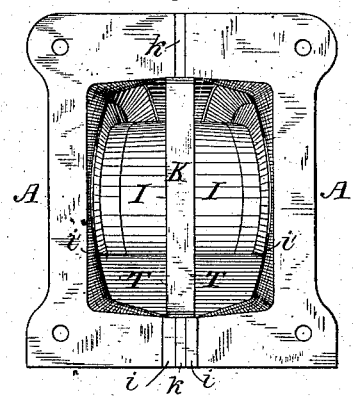
Figure 10:
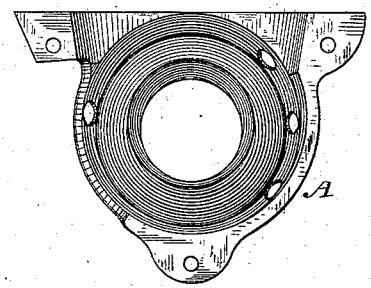
Figure 8:
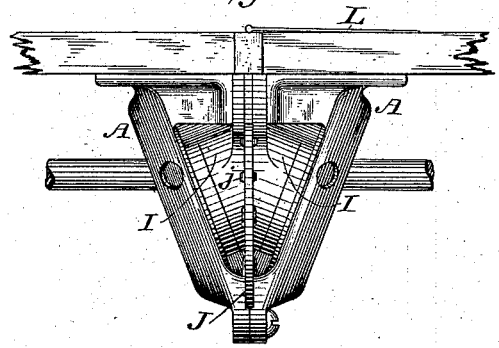
Figure 11:
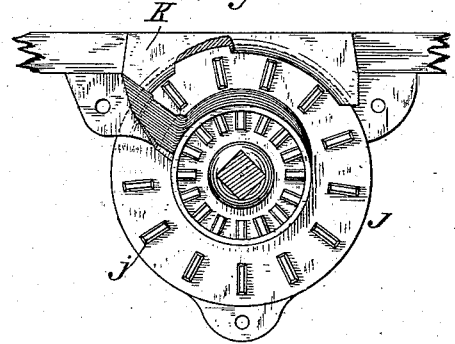
Figure 9:
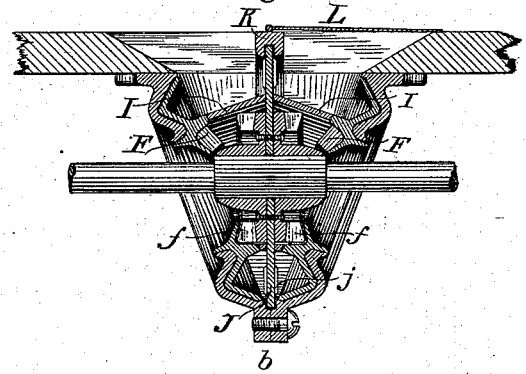
Figure 12:
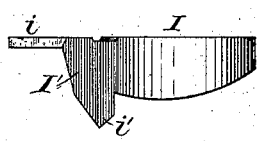
Figure 13:
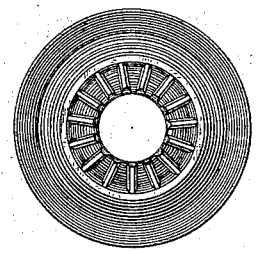
Figure 14:
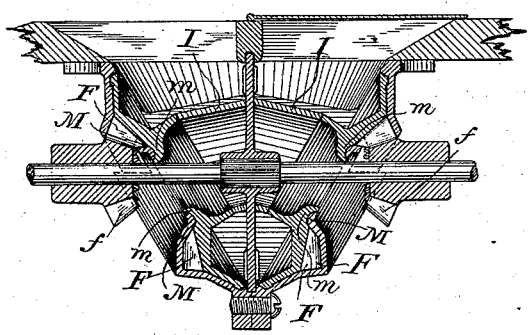
Figure 15:
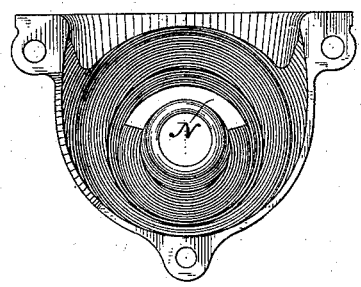
Figure 16:
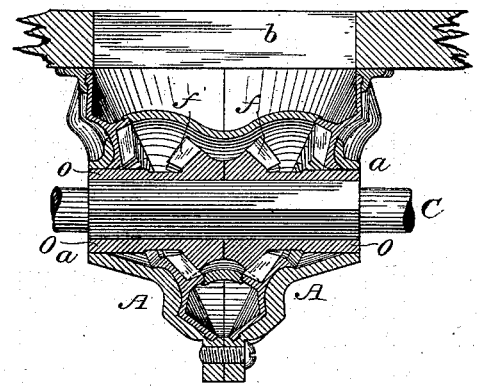

Figure 1 is a plan view, showing the seed-cup, feed-wheels, &c., of a single-run distributer. Fig. 2 is a rear elevation, showing the distributer as though attached to the bottom board of a hopper or supply-box. Fig. 3 is a vertical central section. Fig. 4 is an elevation of one-half or section of a feed cup or casing, looking at the inner side thereof when in its working or oblique position. Fig. 5 is a side elevation with one of the feed-wheels and one section of the feed-cup removed and the driving-shaft in section. Fig. 6 is a view as seen from the under side of a guard-ring or interior casing and bearing which surrounds the driving-shaft between the feed-wheels, incloses the pinions of the driving-shaft and keeps the feed-wheels the proper distance apart and in their bearings in the feed-cup. Fig. 7 is a plan view of a double-run distributer. Fig. 8 is a rear elevation, showing the distributer as though in working position at the bottom of a hopper. Fig. 9 is a vertical central section. Fig. 10 shows an inside elevation of one section of a feed-cup in its oblique or working position. Fig. 11 is a side elevation with one of the feed-wheels and one section of the feed-cup removed, exposing the central feed-disk. Fig. 12 is a plan view of one section of a two-part guard-ring or interior casing and bearing, which is interposed between the central feed-disk and the oblique feed-wheels. Fig. 13 is a view of one of the feed-wheels, showing its inner face. Fig. 14 shows a vertical central section of a modified form of double-run distributer. Fig. 15 is an inside view, representing in its oblique or working position one section of the feed-cup forming part of said modification. Fig. 16 is a vertical central section of another modification, and Fig. 17 an inside view of one section of the feed-cup, forming part thereof.

Sectional casings or feed-cups, each made in two parts, A A, are secured in any desired manner to the bottom B of a suitable hopper or supply-box. Each feed-cup is beneath an opening, $b$, in the hopper-bottom. The feed-cups are each so formed as to approximate an inverted cone in shape when the cup is viewed from front or rear, the sides of the cup being inclined and converging from top to bottom, so as to provide a cup narrowed almost to a point at bottom, and gradually widening out toward the top. Circular openings $a\ a$ in the sides of the cup-sections admit of the free passage through the cup (or series of cups) of a driving-shaft, C, of a diameter much less than that of these openings, which, as soon to be described, serve as bearings for feed-wheels. Owing to the inverted cone form or V shape of the feed-cup its sides are oblique to the driving-shaft. As shown, the sections A A of the feed-cup are detachably secured to each other and to the hopper-bottom B by means of screw-taps or threaded perforations in three corresponding lugs, $b'$, of each section, and screws passing through these lug-taps and corner-perforations $a'$ in the flanged tops or heads A' A' of the sections, through which screws take into the hopper-bottom. At rear the feed-cup is provided with a discharge-opening, D, formed by cutting away or recessing the rear walls of the cup-sections, and curved flanges or lips $d\ d$, constituting a short discharge-spout, are provided. This discharge-spout may be omitted, and a drill-tube may be secured in suitable way to the cup to receive the grain or fertilizer discharged at the opening D.

Feed-wheels E E are arranged obliquely to the driving-shaft with their peripheral portions approaching closely to each other at bottom. The inclination of the pair of feed-wheels corresponds with that of the sides of the cup-sections, and their feeding surfaces or faces are consequently separated widely, comparatively speaking, at their tops, and converge downwardly or toward their bottoms. The feed-wheels are inclosed in and supported by the feed-cup, the wheels having bearings at their backs in or against the sides of the cup-sections, and having central bearings in the bearing-openings $a\ a$ of the cup-sections.

As the feed-wheels are duplicates of each other, detailed description need be give of one only. It is open at its center to accommodate the driving-shaft C, and this central opening is surrounded by an outwardly-projecting annular bearing flange or hub, E', which fits and turns freely in its bearing-opening $a$ of the feed-cup. Surrounding its central bearing there are gear-teeth provided upon the face of the wheel constituting a bevel-gear, F. Outside or surrounding the bevel-gear there is provided an inwardly-projecting annular bearing-flange, $e$, and between this flange and the periphery of the wheel its face is of depressed or recessed form. The depressed face of this portion $e'$ of the wheel constitutes its feeding-surface, and the depression may be either of concave or angular outline in cross-section. The back of the feed-wheel at $e'$ bulges or projects correspondingly with the depression in its face, and this annularly-bulged portion of the wheel is received into a correspondingly shaped bearing-recess, D', in the contiguous side of the feed-cup. At the back of the periphery of the feed-wheel there is a slight annular bearing-projection, $d'$, which is received into a corresponding bearing-groove in the feed-cup. A guard-ring or interior casing and bearing, G, is interposed between the feed-wheels. The bearing-flanges $e\ e$ of the wheels are in contact with the edges of this guard-ring, and the wheels are thus held to their bearings in the cup-sides. The edges of the guard-ring are shouldered and slightly overlap the wheel-flanges, thus preventing ready access of substances to the inside of the guard-ring or central part of the cup from the feed-passage, which extends partly around the guard-ring, as will readily be understood. A double-bevel pinion or pair of such pinions, $f\ f$, rotating with the driving-shaft C, mesh with the bevel-gears of the feed-wheels and rotate these wheels in the direction indicated by the arrows in Fig. 1. The pinions may be formed together or separately. They are shown as engaged with the driving-shaft, so as to be forced to rotate therewith, by means of a squared portion, $f'$, of the shaft, which fits in a correspondingly-shaped opening through the pinions. The guard-ring or interior casing, G, surrounds and protects the pinions $f\ f$, and is formed with a rearwardly-projecting arm or securing-lug, G', which is clamped between the two sections of the feed-cup. This arm projects between the cup-sections at the discharge-opening formed at the back of the cup, and is engaged and held, when the cup-sections are clamped together, by seat-lugs $g\ g$ of the cup-sections. In this way the guard-ring is prevented from moving. The securing-arm G' serves also, by means of side projections or inclined shoulders, $g'\ g'$, to prevent the material being distributed from being carried beyond the point of discharge by the feed-wheels. The shoulders $g'\ g'$ are doubly inclined to correspond with the form of the recesses in the feed-wheels into which they project.

Inside the feed-cup and over the rear portion of the guard-ring G there is secured a guard-plate, H. This plate constitutes a portion of the interior casing, of which the guard-ring is the main member; and it may either be formed in one piece with or rigidly attached to the guard-ring, or, as in this instance shown, be separately made and not attached to the ring. The guard-plate is secured by means of a perforated lug, H', between the rear lugs, $b'$ $b'$, of the feed-cup. From its securing-lug the plate inclines downwardly and forwardly, and is formed with a central lip, $h$, resting upon the guard-ring, and with side lugs, $h'$ $h'$, which rest upon or close to the depressed feeding-surfaces of the feed-wheels and embrace the guard-ring. The edges of the guard-ring are provided with notches $g^2$ $g^2$, to be engaged by the lugs $h'$ $h'$, and these lugs are doubly inclined, so as to correspond in outline with and fit snugly in the recessed surface of the feed-wheels.

It will be seen that the interior casing confines the material admitted to the feed-cup to a passage-way extending from the guard-plate forwardly, downwardly, and upwardly to the securing-arm of the guard-ring.

The detail description so far given relates, particularly, to the first six figures of the drawings; but leading features of my invention common to said figures and other figures of the drawings are similarly lettered throughout.

To provide a double-run distributer my improvements are modified, as will next be described, with reference to Figs. 7 to 13, inclusive.

Instead of the before-described one-part guard-ring of the interior casing, I employ a sectional guard-ring, made in two parts, I I, each part being provided with an upwardly and rearwardly projecting arm or plate portion, I', terminating in a perforated securing-lug, $i$, which is clamped between the rear lugs, $b'$ $b'$, of the cup-sections A A. Lateral lugs $i'$ $i'$, one on each section of the guard-ring, are doubly inclined to correspond in outline with the shape of the recess in the feeding-surface of each of the feed-wheels, into which they project. A third feed-wheel is formed by a vertical disk, J, located centrally between the oblique feed-wheels E E, and supported by the shaft C, by being firmly secured to and between the pinions $f$ $f$ of this shaft. This centrally-arranged vertical disk is thus caused to turn with the shaft and its pinions and between the two sections of the interior casing or guard-ring, I I. At top the disk enters and rotates in a guiding and supporting groove in a curve or arched bridge-bar, K, secured by lugs $k$ $k$ between the front and rear pairs of lugs $b'$ $b'$ of the feed-cup sections. A cut-off or valve, L, hinged to the bridge-bar, serves to shut off the supply of material to the feed-cup at one side of the disk J should it be desired to distribute by a single run. When the cut-off is elevated and held up in a suitable way, there is a double-run discharge, a stream issuing from the discharge-opening of the feed-cup on each side of the central feed-disk, which is provided with face ribs or teeth $j$ on its opposite sides, to facilitate the feed. A guide-groove, $l$, formed in the cup-section at bottom, receives the lower portion of the feed-disk, and the sections I of the interior casing have grooves or notches $l'$ (see Fig. 12) for the passage of the ribs $j$ of the disk. The oblique feed-wheels may be provided with face-ribs as well as the vertical central disk, if desired; but the ribs are not necessary upon the recessed feeding-surfaces of the obliquely-set feed-wheels to secure certainty of action.

In the modified form of double-run distributer, (shown by Figs. 14 and 15,) the bevel-gears F F, surrounding the central openings of the feed-wheels, are formed on the backs or outer sides of the wheels, instead of on their inner sides or faces, as before, and the hub-like bearings of the wheels project inwardly instead of outwardly, and turn in contact with the sectional interior casing or two-part guard-ring and bearing I I. An inwardly-projecting annular bearing-projection, M, surrounding the central bearing-opening, $a$, of each feed-cup section, is received into a bearing-recess of an annular flange, $m$, of the adjacent feed-wheel. Surrounding each of the feed-cup-bearing projections M there is a space provided between the feed-wheel and cup-section to accommodate the gear F of the feed-cup. The hub of the vertical central feed-disk, J, is secured on the squared portion of the shaft inside the interior casing. The bevel-pinions $f$ $f$ of the shaft are outside of the feed-wheels, instead of inside of them, as before, and each of these pinions engages its gear through or by way of slots N in the feed-cup sections.

Figure 17:
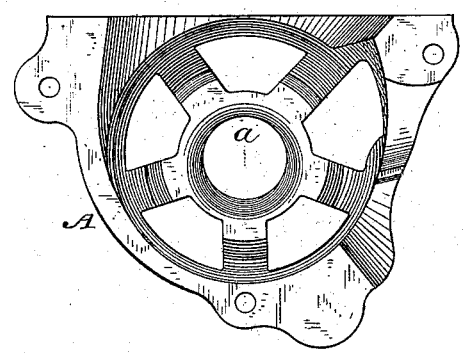

In the modifications shown by Figs. 16 and 17 the pinions $f$ $f$ have bearings, by means of their hubs O O, in the bearing-openings $a$ $a$ of the cup-sections, outside of the central bearings of the feed-wheels in the cup-sections.

I claim as of my own invention—

1. The combination of the driving-shaft and the pair of feed-wheels arranged obliquely thereto, and converging from top to bottom, substantially as and for the purpose hereinbefore set forth.

2. The combination, substantially as hereinbefore set forth, of the feed-cup or casing, the oblique feed-wheels therein, and the driving-shaft actuating the feed-wheels.

3. The combination, substantially as hereinbefore set forth, of the feed-cup, of approximately inverted-cone shape, and the oblique feed-wheels having their bearings in the sides of the feed-cups.

4. A feed-wheel constructed with the central bearing, and the surrounding bevel-gear, substantially as and for the purpose hereinbefore set forth.

5. The combination of the feed-cup, the driving-shaft, the pinions on the driving-shaft, and the oblique feed-wheels supported in the feed-cup, and having the bevel-gears engaged by the driving-shaft pinions, substantially as and for the purpose hereinbefore set forth.

6. The combination, substantially as hereinbefore set forth, of the feed-cup, of approximately inverted-cone shape, the oblique feed-wheels having their bearings in the feed-cup sides, and the interior casing interposed between the feed-wheels.

7. A sectional feed-cup, of approximately inverted-cone shape, provided with side bearings for oblique feed-wheels, substantially as and for the purpose hereinbefore set forth.

8. The combination, substantially as hereinbefore set forth, of the feed-cup, the oblique feed-wheels supported thereby, the driving-shaft actuating the feed-wheels, and the vertical central feed-disk rotating with the driving-shaft.

In testimony whereof I have hereunto subscribed my name this 26th day of November, A. D. 1883.

ANDREW J. MARTIN.

Witnesses:
T. E. SHEPHERD,
NELLIE SHEPHERD.